United States Patent [19]

Dodgen et al.

[11] Patent Number: 5,968,254
[45] Date of Patent: Oct. 19, 1999

[54] CONCRETE MIX CONTAINING COAL ASH AND ORGANIC PLANT ASH

[75] Inventors: Harold Dean Dodgen, Hiram, Ga.; Charles Lamar Larrimore, Birmingham, Ala.

[73] Assignee: Southern Company Services, Birmingham, Ala.

[21] Appl. No.: 09/078,303

[22] Filed: May 13, 1998

[51] Int. Cl.$^6$ ................................................ C04B 7/28
[52] U.S. Cl. ..................... 106/705; 106/679; 106/708; 106/709; 106/805; 106/DIG. 1
[58] Field of Search .................... 106/705, 708, 106/679, DIG. 1, 709, 805

[56] References Cited

U.S. PATENT DOCUMENTS

| | | |
|---|---|---|
| 194,143 | 8/1877 | Gostling . |
| 611,621 | 10/1898 | Frenchel . |
| 1,311,051 | 7/1919 | Curtis . |
| 1,442,002 | 1/1923 | Reisig, Sr. ............................. 106/708 |
| 1,526,694 | 2/1925 | Christiansen . |
| 1,895,159 | 1/1933 | Greenawalt . |
| 3,403,205 | 9/1968 | Ottenholm . |
| 3,957,528 | 5/1976 | Ott et al. . |
| 4,105,459 | 8/1978 | Mehta ................................... 106/737 |
| 4,120,738 | 10/1978 | Tate . |
| 4,249,954 | 2/1981 | Keogh . |
| 4,586,958 | 5/1986 | Matsuura et al. ..................... 106/708 |
| 4,659,679 | 4/1987 | Falk ....................................... 106/705 |
| 4,829,107 | 5/1989 | Kindt et al. ........................... 106/709 |
| 5,346,548 | 9/1994 | Mehta . |
| 5,346,549 | 9/1994 | Johnson . |
| 5,413,633 | 5/1995 | Cook et al. . |
| 5,500,044 | 3/1996 | Meade et al. . |
| 5,534,058 | 7/1996 | Strabala . |
| 5,536,310 | 7/1996 | Brook et al. ......................... 106/708 |
| 5,714,003 | 2/1998 | Styron .................................. 106/708 |

*Primary Examiner*—Anthony Green
*Attorney, Agent, or Firm*—Needle & Rosenburg, P.C.

[57] ABSTRACT

A composition for manufacturing concrete containing cement, coal ash, and organic plant ash, and a process of making such composition.

46 Claims, No Drawings

CONCRETE MIX CONTAINING COAL ASH AND ORGANIC PLANT ASH

FIELD OF INVENTION

This invention is in the field of concrete mixes, and especially relates to concrete mixes that contain fly ash.

BACKGROUND OF THE INVENTION

Concrete is the material of choice in innumerable construction applications, because of its strength, longevity, and ease of use. Concrete is made from a mixture containing hydraulic cement, one or more aggregates, and water, and may also contain various additives that improve or alter the physical properties of the concrete, or that improve the processability of the mixture.

Fly ash, which is produced by the combustion of coal in electricity generating plants, is commonly added to concrete mixes. Fly ash can be added for a number of reasons, but is typically added for its cementitious properties. Some fly ash is itself a cement, and forms concrete when mixed with an aggregate and water. Most fly ash, however, is a natural pozzolan that has cementitious activity only when combined with a source of calcium oxide such as lime or cement. Because of this cementitious activity, fly ash can improve the compressive strength of concrete, and can also improve the resistance of concrete to chemical attack. Fly ash can also lower the cost of the concrete mix.

The concrete mix can also contain an air entraining agent to increase the air content of the finished concrete. Such air entraining agents are commonly included in mixes to entrain air in the finished concrete and thereby improve the resistance of the concrete to harmful freeze-thaw cycles.

Ashes other than fly ash have also been proposed for use in concrete. For example, U.S. Pat. No. 5,500,044 to Meade et al., and U.S. Pat. No. 3,957, 528 to Ott et al., disclose concrete mixes that contain the ash generated by a municipal waste incinerator. U.S. Pat. No. 5,346,548 to Mihta discloses a concrete mix containing the ash generated by rice husks. U.S. Pat. No. 611,621 to Frenchel discloses a concrete mix prepared from cement and wood ash.

None of the foregoing patents discloses the concrete mix of the present invention. Moreover, none of the ashes used in the above patents have been shown to improve the properties of concrete, and none have been commercially accepted in the concrete industry as a suitable additive for concrete.

It has been unexpectedly found, therefore, that ash generated by burning woody tissues, when combined with cement and coal ash, actually improves the physical properties of finished concrete. The woody tissue can be burned along with the coal to produce a mixture of woody tissue ash and coal ash, or it can be burned separately from the coal and subsequently combined with the coal ash and cement to obtain a suitable concrete mix. It has been unexpectedly found that woody tissue ash helps to entrain air in the finished concrete, and thereby improves the freeze-thaw characteristics of the concrete, while reducing (if not eliminating) the amount of artificial air entraining agent that must be included in the concrete mix.

SUMMARY OF THE INVENTION

In accordance with the purpose(s) of this invention, as embodied and broadly described herein, this invention in one aspect provides a composition comprising cement and ash, wherein the ash consists essentially of ash from coal and woody tissue sources.

This invention in another aspect provides a composition comprising cement and ash, wherein the ash consists essentially of coal ash and organic plant ash that comprises less than 55 wt. % silica.

In yet another aspect the invention provides a method of preparing a concrete mix comprising mixing cement and ash that consists essentially of coal ash and woody tissue ash or organic plant ash comprising less than 55 wt. % silica.

In still another aspect the invention provides a method of preparing a concrete mix comprising mixing cement, coal ash, and woody tissue ash or organic plant ash comprising less than 55 wt. % silica, sequentially or simultaneously and in any order, wherein the concrete mix is substantially free of ashes from any other source.

Additional aspects and advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention may be understood more readily by reference to the following detailed description of preferred embodiments of the invention and the Examples included therein.

Before the present compounds, compositions and methods are disclosed and described, it is to be understood that this invention is not limited to specific methods, or to particular concrete formulations, as such may, of course, vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "an additive" includes mixtures of additives, reference to "a cement" includes mixtures of two or more cements, and the like.

Ranges are often expressed herein as from about one particular value, and/or to about another particular value. When such a range is expressed, it is to be understood that a more preferred range is typically from the one particular value and/or to the other particular value. Similarly, when values are expressed as approximations, by use of the antecedent "about," it will be understood that the particular value is typically more preferred.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

"Cement" means a flowable material, in particulate or granular form which, when combined with water and allowed to set, gives a hard rock-like material. The term cement also includes the material obtained upon combining cement with water, including both the resultant rock-like material and plastic intermediate. Examples of cement include ordinary portland cement, blended portland cements, special portland cements, high alumina cements, expansive cements, hydraulic lime, natural cement, super-sulfated cement, slag cement, masonry, and latent hydraulic materials such as granulated blast furnace slags and pozzolans. Special portland cements include white portland cement, colored cements, oil well cements, rapid setting portland cement, regular set cement, water proof cement, hydrophobic cement, anti-bacterial cement, barium cements, and strontium cements. Blended portland cements include any intimate and uniform mixture of portland cement and a pozzolanic or other cementitious material in which the portland cement is the major constituent.

"Woody tissue" means any cellulosic organic matter that contains lignin, and is preferably derived from trees and shrubs. Woody tissue includes any part of a tree or shrub, but preferably refers to the branches, trunks and stalks, and materials derived from such branches, trunks, and stalks, in which the concentration of lignin is highest. Woody tissues thus include, for example, whole trees, whole shrubs, logs, tree branches, tree trunks, paper mill sludge, bark, leaves, wood pulp, lumber, sawdust, and wood pieces.

"Woody tissue ash" refers to the ash generated by the combustion of woody tissue.

"Organic plant ash" refers to the ash generated by the combustion of any plant material, including woody tissue, grass, crop residue, and the like.

"Coal" includes all types of commercially mined coal including without limitation anthracite, bituminous, lignite, and subbituminous coal. Coal ash refers to the material obtained upon combusting coal.

"LOI" stands for loss on ignition, and represents the weight percentage of carbon and other volatile components in coal or other carbonaceous material that is not burned during the combustion process, and which is contained in the ash from the combustion process.

"Optional" or "optionally" means that the subsequently described event or circumstance may or may not occur, and that the description includes instances where said event or circumstance occurs and instances where it does not. For example, the phrase "optionally containing an additive" means that the additive may or may not be included and that the description includes compositions in which the additive is present or absent.

By the term "effective amount" of a compound or property as provided herein is meant such amount as is capable of performing the function of the compound or property for which an effective amount is expressed. The exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

In one aspect the invention provides a composition comprising cement and ash, wherein the ash consists essentially of ash from coal and woody tissue sources. In another aspect the invention provides a composition comprising cement and ash, wherein the ash consists essentially of coal ash and organic plant ash that comprises less than 55 wt. % silica. The composition typically is prepared by mixing a cement with ash. The ash can be derived from the simultaneous combustion of coal and woody tissue or organic plant ash, or the coal and woody tissue or organic plant material can be combusted separately. If the coal and woody tissue or organic plant material are combusted separately, they can be combined before being mixed with the cement, or they can be mixed with the cement in any other order.

Thus, in another aspect the invention provides a method of preparing a concrete mix comprising mixing cement and ash that consists essentially of coal ash and woody tissue ash or organic plant ash comprising less than 55 wt. % silica. In still another aspect the invention provides a method of preparing a concrete mix comprising mixing cement, coal ash, and woody tissue ash or organic plant ash comprising less than 55 wt. % silica, sequentially or simultaneously and in any order, wherein the concrete mix is substantially free of ashes from any other source.

While any coal ash is typically suitable for practicing the invention, preferred coal ashes satisfy one or more of various chemical requirements related to fineness, mineral oxide content, and loss on ignition. Coal ash is preferably of a fineness that no more than about 34% is retained when wet sieved on a 45 micrometer sieve. Preferred coal ash also contains greater than 50 wt. % mineral oxides (such as silicone and aluminum oxides). Class F and Class C fly ashes, as defined by ASTM C 618-97 (hereby incorporated by reference), are especially preferred, with Class F fly ashes (having pozzolanic activity but no cementitious properties) being most preferred.

It is believed that any type of cement is generally suitable for practicing the invention. Typical cements are described by ASTM standards C 150-97 and C 595-94 (hereby incorporated by reference), and are shown in the following table.

| Standard Types of Portland Cements and Blended Portland Cements |   |
| --- | --- |
| Portland cements and air-entraining portland cements (ASTM C 150-97) | |
| Type I | For use when the special properties specified for any other type are not required |
| Type IA | Air-entraining cement for the same uses as Type I, where air entrainment is desired |
| Type II | For general use, more especially when moderate sulfate resistance or moderate heat of hydration is desired |
| Type IIA | Air-entraining cement for the same uses as Type II, where air entrainment is desired |
| Type III | For use when high early strength is desired |
| Type IIIA | Air-entraining cement for the same uses as Type III, where air entrainment is desired |
| Type IV | For use when a low heat of hydration is desired |
| Type V | For use when high sulfate resistance is desired |
| Portland blast-furnace slag cements and portland pozzolan cements (ASTM C 595-94) | |
| Type IS[a] | Portland blast-furnace slag cement for use in general concrete construction |
| Type IS-A[a] | Corresponds to type IA air-entraining portland cement |
| Type IP[a] | Portland-pozzolan cement for use in general concrete construction |
| Type IP[b] | Portland-pozzolan cement for use in concrete construction where high strengths at early ages are not required |
| Type P-A[b] | Air-entraining portland-pozzolan cement for use in concrete construction where high strengths at early ages are not required |

[a]Moderate sulfate resistance or moderate heat of hydration, or both, may be specified by adding the suffixes (MS) or (MH), or both, to the selected type designation.
[b]Moderate sulfate resistance or low heat of hydration, or both, may be specified by adding the suffixes (MS) or (LH), or both, to the selected type designation.

Cement types I and II are more typically used.

The woody tissue ash can be derived from the combustion of any woody tissue. It is believed that ash derived from woody tissue has a unique chemical content and physical structure that improves the air entrainment capacity of the concrete, and reduces (and potentially eliminates) the amount of conventional air entraining agent that must be added to a concrete mix to achieve a desired level of air entrainment. The woody tissue ash can be obtained by burning the woody tissue by itself and collecting the residual ash, or it can be obtained by mixing the woody tissue with coal and burning the combined mixture in, for example, a coal fired boiler.

It is believed that the lignin in woody tissue, when burned, contributes to the physical structure and chemical content of the ash, and contributes to the desirable air entrainment capacity of woody tissue ash. Preferred woody tissue ash, however, also has other properties that can contribute to its effectiveness as an additive in concrete mixes. Moreover, other plant materials have these properties when burned, and would also be expected to be effective additives in concrete mixes in the methods or compositions of this invention.

For example, preferred ash from woody tissue or other organic plant sources comprises less than about 55 wt. % silica, more preferably less than about 45 wt. % silica, and even more preferably less than about 35 wt. % silica. In any event, the ash preferably comprises greater than about 5 wt. % silica, and more preferably greater than about 15 wt. % silica, and most preferably greater than about 25 wt. % silica.

In a separate embodiment the ash from woody tissue or other plant sources is limited by the content of mineral oxides other than silica, such as aluminum, iron, potassium, and sodium oxides. The ash from the woody tissue or organic plant material preferably comprises from about 3.0 to about 35 wt. % of these other mineral oxides, more preferably from about 4.0 to about 25 wt. %, and even more preferably from about 5.0 to about 15 wt. %.

Preferred plant and woody tissue ashes can also typically be characterized by variables such as size and LOI. Preferred plant and woody tissue ashes are particulate compositions in which the majority of particles, more preferably greater than 65%, are smaller than 45 microns in diameter. Preferred plant and woody tissue ashes also have a LOI of from about 15% to about 30%, and even more preferably from about 20% to about 25%.

The amount of coal ash in the mixture can vary depending upon the reason for including the coal ash in the mixture. (i.e. cost reduction, chemical resistance, enhanced air entrainment, or strength improvement). The amount of woody tissue or other organic plant ash that is mixed with the cement similarly can vary depending upon the reasons for including the woody tissue or other organic plant ash in the mixture.

Within reasonable limits, woody tissue and other organic plant ash does not generally affect the physical properties of concrete in any negative respects, and can therefore be added to the mixture to reduce cost. Woody tissue and other organic plant ash can also improve the air entrainment capacity of concrete, and decrease (or eliminate) the amount of air entraining agent that must be employed to attain a particular air content in the finished concrete, especially in concrete mixes that also contain coal ash. An effective amount of woody tissue or other organic plant ash is preferably added to function as an air entraining agent, and preferably is added to the composition to optimize the air entrainment capacity of the concrete, and to minimize the amount of any other air entraining agent that must be employed.

The cement and ash are typically mixed at ratios common for the mixture of cement and fly ash, and typically do not exceed a weight ratio of about 1:1 ash:cement. The weight ratio of ash to cement typically ranges from about 1:20 to about 1:1 ash:cement, preferably ranges from about 1:10 to about 1:2, and even more preferably ranges from about 1:5 to about 1:4. The coal ash and woody tissue or other organic plant ash are typically added to the composition at a weight ratio of from about 1000:1 to about 10:1, even more preferably at a weight ratio of from about 100:1 to about 20:1, and still even more preferably at a weight ratio of from about 90:1 to about 30:1.

Because of the difficulty determining woody tissue or other organic plant ash percent in an ash that is obtained by simultaneously combusting woody tissue or other plant material and coal, it is often preferable to express percentages of coal ash or woody tissue or other organic plant ash based upon the respective weights of coal and woody tissue or other plant material before combustion. The composition of organic plant ash and coal ash preferably is derived from an unburned combination of coal and plant material comprising from about 1 to about 50 wt. % woody tissue or other plant material, more preferably comprises from about 8 to about 30 wt. % woody tissue or other plant material, and most preferably comprises from about 10 to about 25 wt. % woody tissue or other plant material.

Many other materials can, of course, be mixed with the composition in order to obtain a suitable concrete. For example, the composition preferably comprises a fine or coarse aggregate or both. Typical aggregates include any more or less inert, granular, usually inorganic material consisting normally of stone(s) or stone-like solid(s). Examples are sand, gravel, crushed stone, and crushed slag. Aggregates can be natural or manufactured, and can be fine or coarse.

The composition may also include other additives. The most frequently used additives include (1) accelerators to increase the rate of setting or the rate of hardening or both at early stages, including some of the soluble chlorides (primarily calcium chloride), carbonates and silicates; (2) water reducing or set retarding additives to reduce the water requirement of concrete, or to retard the set, or both, including lignosulfonic acids, hydroxylated carboxylic acids, carbohydrates, polyols and the salts in modifications of these (primarily calcium lignosulfonate); (3) air entraining additives to introduce a system of small air bubbles into the fresh concrete during mixing, usually anionic surface-active agents; and (4) finely divided mineral additives to increase the chemical resistance of concrete, reduce the heat of hydration, reduce expansion produced by alkali-aggregate reaction, improve the properties of fresh concrete, and so on. Other specific additives can, of course, also be mixed with the composition.

The concrete mix is beneficial both in the presence and absence of added air entraining agents. Compositions that contain a combination of woody tissue and air entraining agent surprisingly require less air entraining agent than mixes that do not contain any woody tissue ash. This is also true of ashes from suitable plants other than woody tissues. Moreover, the amount of air entraining agent that is required is typically reduced in relation to the quantity of woody tissue or other organic plant ash contained in the composition.

Any air entraining agent is suitable, and is benefitted by the addition of woody tissue or other organic plant ash to the mix. Exemplary air entraining agents include salts of wood resins, synthetic detergents, salts of sulfonated lignin, salts of petroleum acids, salts of proteinaceous materials, fatty and resinous acids and their salts, and organic salts of sulfonated hydrocarbons. Of these, the anionic surface-active agents are preferred. Particularly preferred air entraining agents include stabilized modified resin surfactants, such as MONEX AIR 40, a product of Boral Material Technologies, San Antonio, Tex.

As noted above, the invention has particular application to concretes in which a particular air content is desired. In a preferred embodiment the composition of the present invention is a hardened concrete comprising from about 2.5 to about 7.0 vol. % air. In an even more preferred embodiment the hardened concrete comprises from about 3.5 to about 5.5 vol. % air.

The composition is used to prepare concrete, and may be present as a flowable mixture (such as the dry mix preparation used in preparing concrete), a plastic flowable composition (such as a dry mixed preparation mixed with water and optionally mixed with aggregates and/or other additives), a finished concrete, or as any intermediate formed during the preparation of concrete. The amount of water added to (or contained in) the composition varies depending upon the amount of cementitious materials in the mixture. The weight ratio of water to cementitious materials typically ranges from about 0.3:1 to about 0.9:1, preferably ranges from about 0.4:1 to about 0.8:1, and more preferably ranges from about 0.45:1 to about 0.65:1. The water also is preferably added at a weight of from about 250 to about 350 pounds per cubic yard of the concrete mix.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature, and pressure is at or near atmospheric.

Example 1

Three mixtures of coal ash and wood ash were prepared as follows: A first batch of 100% coal ash was obtained by burning pulverized coal in a coal fired boiler at about 2000–3000 F. The coal ash qualified as Class F ash under ASTM C 618-97. A second batch of coal and wood ash was obtained by burning a second batch of green tree trimming waste with coal at a 9:1 wt. ratio of coal to wood. A third batch of coal and wood ash was obtained by combining equal portions of ash from the first two batches. The three coal/wood ash mixtures were combined with type I/II Portland Cement in a concrete mix at the ratios given in Table 1.

1855–1926 lbs. of coarse aggregate (crushed limestone) per cubic yard, and 957–1295 lbs. fine aggregate (natural river sand) per cubic yard, were first mixed together with the commercial air entraining agent and about ⅔ of the total water for about one minute. Cement and ash were next added to the mixture and mixed for about one minute. Water and water reducing additive were then added to the mixture until the mixture attained a slump of between 3.25 and 5.25 inches, as measured by ASTM C143, and mixed for about 1.5 minutes. After pausing for about three minutes, the mixture was mixed again for about two minutes.

Sufficient commercial air entraining agent was also added to the concrete mix to achieve an air content of between 3.3 and 6.0 vol. % in the set concrete as measured by ASTM C231. The water reducer was a MONEX LR water reducer. The amount of commercial air entraining agent added to each of the various mixtures is recorded in Table 1.

TABLE 1

| Cement/Ash (Wt.) | Coal/Wood (Wt.)** | Air Dosage (oz/cwt)*** |
|---|---|---|
| 3/1 | 100/0 | 0.46 |
|  | 95/5 | 0.46 |
|  | 90/10 | 0.34 |
| 3/2 | 100/0 | 0.55 |
|  | 95/5 | 0.55 |
|  | 90/10 | 0.46 |
| 4/1 | 100/0 | 0.46 |
|  | 95/5 | 0.37 |
|  | 90/10 | 0.32 |
| 4/2 | 100/0 | 0.61 |
|  | 95/5 | 0.51 |
|  | 90/10 | 0.42 |
| 5/1 | 100/0 | 0.42 |
|  | 95/5 | 0.41 |
|  | 90/10 | 0.38 |
| 5/2 | 100/0 | 0.65 |
|  | 95/5 | 0.57 |
|  | 90/10 | 0.52 |

**Weight ratio based upon weight of raw materials before combustion.
***Ounces of air entraining agent per 100 lbs. of total cementitious materials (ash plus cement)

Example 2

Materials were combined in the same order and timing of mixing given in Example 1. Coal ash, wood ash, and Type I/II Portland Cement were combined in a concrete mix at the ratios given in Table 2. The coal ash was obtained by burning pulverized coal in a coal fired boiler. The coal ash qualified as class F fly ash under ASTM C 618-97. The wood ash was obtained from the wood (bark) fired boiler of a paper mill.

Water was added to the concrete mix until the mix attained a slump of between 2.75 and 5.5 inches, as measured by ASTM C143. 1817–1927 pounds of coarse aggregate, and 1034–1353 pounds of fine aggregate, were added per cubic yard of concrete. MONEX LR water reducer was also added to the concrete mix. Sufficient commercial air entraining agent was added to the concrete mix to achieve an air content of between 3.0 and 5.6 vol. % in the set concrete as measured by ASTM C231. The amount of commercial air entraining agent added to each of the various concrete mixes is recorded in Table 2.

TABLE 2

| Cement/Ash (Wt.) | Coal/Wood (Wt.) | Air Dosage (oz/cwt) |
|---|---|---|
| 3/1 | 100/0 | 0.42 |
|  | 90/10 | 0.31 |
|  | 80/20 | 0.22 |
|  | 70/30 | 0.31 |
| 3/2 | 100/0 | 0.58 |
|  | 90/10 | 0.49 |
|  | 80/20 | 0.41 |
|  | 70/30 | 0.49 |
| 4/1 | 100/0 | 0.37 |
|  | 90/10 | 0.28 |
|  | 80/20 | 0.23 |
|  | 70/30 | 0.31 |
| 4/2 | 100/0 | 0.56 |
|  | 90/10 | 0.46 |
|  | 80/20 | 0.42 |
|  | 70/30 | 0.61 |
| 5/1 | 100/0 | 0.43 |
|  | 90/10 | 0.41 |

TABLE 2-continued

| Cement/Ash (Wt.) | Coal/Wood (Wt.) | Air Dosage (oz/cwt) |
|---|---|---|
|  | 80/20 | 0.34 |
|  | 70/30 | 0.46 |
| 5/2 | 100/0 | 0.65 |
|  | 90/10 | 0.57 |
|  | 80/20 | 0.49 |
|  | 70/30 | 0.62 |

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising:
    a. cement; and
    b. ash, wherein (i) the ash consists essentially of ash from coal and woody tissue sources, and (ii) the weight ratio of ash:cement is less than about 1 (weight parts ash divided by weight parts cement).

2. The composition of claim 1 wherein the ash is obtained by the simultaneous combustion of coal and woody tissue.

3. The composition of claim 1 wherein the ash is obtained by mixing coal ash and woody tissue ash.

4. The composition of claim 1 wherein the composition is a dry flowable mixture.

5. The composition of claim 1 wherein the composition is a wet plastic mixture.

6. The composition of claim 1 wherein the composition is hardened concrete.

7. The composition of claim 1 wherein the composition is hardened concrete having an air content of from about 3.5 vol. % to about 5.5 vol. %.

8. The composition of claim 1 wherein the cement comprises portland cement.

9. The composition of claim 1 further comprising water.

10. The composition of claim 1 farther comprising a processing aid.

11. The composition of claim 1 further comprising an air entraining agent.

12. The composition of claim 1 comprising ash and cement at a weight ratio of from about 1/20 to less than about 1 (weight parts ash divided by weight parts cement).

13. The composition of claim 1 comprising ash and cement at a weight ratio of from about 1/10 to about ½ (weight parts ash divided by weight parts cement).

14. The composition of claim 1 comprising coal ash and woody tissue ash at a weight ratio of from about 1000 to about 10 (weight parts coal ash divided by weight parts woody tissue ash).

15. The composition of claim 1 comprising coal ash and woody tissue ash at a weight ratio of from about 100 to abut 20 (weight tarts coal ash divided by weight parts woody tissue ash).

16. The composition of claim 1 comprising water and cement at a weight ratio of from about 0.3 to about 0.9 (weight parts water divided by weight parts cement).

17. The composition of claim 1 comprising water and cement at a weight ratio of from about 0.4 to about 0.8 (weight parts water divided by weight parts cement).

18. A composition comprising cement and ash, wherein (i) the ash consists essentially of (a) coal ash and (b) organic plant ash comprising less than 55 wt. % silica, and (ii) the weight ratio of ash:cement is less than about 1 (weight parts ash divided by weight parts cement).

19. The composition of claim 18 wherein the organic plant ash comprises less than 45 wt. % silica.

20. The composition of claim 18 comprising coal ash and organic plant ash at a weight ratio of from about 1000 to about 10 (weight parts coal ash divided by weight parts organic plant ash).

21. The composition of claim 18 comprising coal ash and organic plant ash at a weight ratio of from about 100 to about 20 (weight parts coal ash divided by weight parts organic plant ash).

22. The composition of claim 18 comprising ash and cement at a weight ratio of from about 1/20 to about 1 (weight parts ash divided by weight parts cement).

23. The composition of claim 18 comprising ash and cement at a weight ratio of from about 1/10 to about ½ (weight parts ash divided by weight parts cement).

24. A method of preparing a concrete mix comprising mixing cement and ash that consists essentially of coal ash and (i) woody tissue ash or (ii) organic plant ash containing less than 55 wt. % silica, wherein the weight ratio of ash:cement is less than about 1 (weight parts ash divided by weight parts cement).

25. A method of preparing a concrete mix comprising mixing cement, coal ash, and (i) woody tissue ash or (ii) organic plant ash containing less than 55 wt. % silica, sequentially or simultaneously and in any order, wherein (a) the concrete mix is substantially free of ashes from any other source, and (b) the weight ratio of ash:cement is less than about 1 (weight parts ash divided by weight parts cement).

26. A composition comprising:
    a. cement; and
    b. ash, wherein (i) the ash consists essentially of ash from coal and woody tissue sources, and (ii) the weight ratio of coal ash to woody tissue ash is from about 1000 to about 10 (weight parts coal ash divided by weight parts woody tissue ash).

27. The composition of claim 26 wherein the ash is obtained by the simultaneous combustion of coal and woody tissue.

28. The composition of claim 26 wherein the ash is obtained by mixing coal ash and woody tissue ash.

29. The composition of claim 26 wherein the composition is a dry flowable mixture.

30. The composition of claim 26 wherein the composition is a wet plastic mixture.

31. The composition of claim 26 wherein the composition is hardened concrete.

32. The composition of claim 26 wherein the composition is hardened concrete having an air content of from about 3.5 vol. % to about 5.5 vol. % .

33. The composition of claim 26 wherein the cement comprises portland cement.

34. The composition of claim 26 further comprising water.

35. The composition of claim 26 further comprising a processing aid.

36. The composition of claim 26 further comprising an air entraining agent.

37. The composition of claim 26 comprising ash and cement at a weight ratio of from about 1/20 to about 1 (weight parts ash divided by weight parts cement).

38. The composition of claim 26 comprising ash and cement at a weight ratio of from about 1/10 to about ½ (weight parts ash divided by weight parts cement).

39. The composition of claim 26 comprising coal ash and woody tissue ash at a weight ratio of from about 100 to about 20 (weight parts coal ash divided by weight parts woody tissue ash).

40. The composition of claim 26 comprising water and cement at a weight ratio of from about 0.3 to about 0.9 (weight parts water divided by weight parts cement).

41. The composition of claim 26 comprising water and cement at a weight ratio of from about 0.4 to about 0.8 (weight parts water divided by weight parts cement).

42. A composition comprising cement and ash, wherein (i) the ash consists essentially of coal ash and organic plant ash comprising less than 55 wt. % silica, and (ii) the weight ratio of coal ash to organic plant ash is from about 1000 to about 10 (weight parts coal ash divided by weight parts organic plant ash).

43. The composition of claim 18 wherein the organic plant ash comprises less than 45 wt. % silica.

44. The composition of claim 18 comprising coal ash and organic plant ash at a weight ratio of from about 100 to about 20 (weight parts coal ash divided by weight parts organic plant ash).

45. The composition of claim 18 comprising ash and cement at a weight ratio of from about 1/20 to about 1 (weight parts ash divided by weight parts cement).

46. The composition of claim 18 comprising ash and cement at a weight ratio of from about 1/10 to about ½ (weight parts ash divided by weight parts cement).

* * * * *